United States Patent [19]
Shwery

[11] Patent Number: 5,299,718
[45] Date of Patent: Apr. 5, 1994

[54] BOTTLE CLOSURES

[76] Inventor: Roy P. Shwery, 502 Crestview La., De Pere, Wis. 54115

[21] Appl. No.: 69,362

[22] Filed: Jun. 1, 1993

[51] Int. Cl.⁵ .............................................. B67D 3/00
[52] U.S. Cl. .................................. 222/518; 222/559; 251/175; 137/903
[58] Field of Search ............... 222/402.25, 511, 518, 222/559, 213; 251/175, 337; 137/903

[56] References Cited

U.S. PATENT DOCUMENTS

| | | | |
|---|---|---|---|
| 2,325,920 | 8/1943 | Rigby | 215/5 |
| 2,678,747 | 5/1954 | Caitung | 215/5 |
| 2,685,978 | 8/1954 | Crockett | 215/78 |
| 3,151,787 | 10/1964 | Miller | 222/518 |
| 3,187,965 | 6/1965 | Bourget | 222/518 |
| 3,275,201 | 9/1966 | Tedescht et al. | 222/402.25 |
| 3,972,452 | 8/1976 | Welsh | 251/175 X |
| 4,522,318 | 6/1985 | Del Bon | 222/518 X |
| 4,676,411 | 6/1987 | Simasaki | 222/517 |
| 4,687,123 | 8/1987 | Hyde | 222/518 |
| 4,715,516 | 12/1987 | Salvall | 222/153 |
| 4,742,942 | 5/1988 | Dokos et al. | 222/501 |
| 4,801,053 | 1/1989 | Kaster | 222/506 |
| 4,877,159 | 10/1989 | Strand | 222/518 X |
| 4,995,534 | 2/1991 | Norman | 222/518 X |

Primary Examiner—Gregory L. Huson
Attorney, Agent, or Firm—Jacobson & Johnson

[57] ABSTRACT

The invention comprises a reusable closure for temporarily sealing a container to prevent escape of liquid and gas from the container with the closure having a molded, one-piece housing having internal threads for securing the housing to a container and a spout for discharging materials therefrom and an integral tapered sealing ring to prevent materials from escaping from the housing with the housing including a frusto-conical seat for engaging a valve stem with flared skirt for temporarily sealing liquid and gas within the container and a resilient push top, located on top of the housing for finger access by the user with the valve stem connected to the underside of the push top, valve stem axially displaceable to permit sealing and resealing of the skirt against the frusto-conical seat in the housing and the resilient push top providing a restoring force to return the valve stem and skirt to a closed condition where the fluid pressures within the container coact with the skirt to prevent escape of liquids or gasses past the skirt.

8 Claims, 1 Drawing Sheet

BOTTLE CLOSURES

FIELD OF THE INVENTION

This invention relates generally to bottle closures, and, more specifically, to improved bottle closures which are washable and permit one to temporarily open the closure to permit removal of a portion of a liquid in a container, and then shut the closure to seal the remaining portion of the liquid within the container.

BACKGROUND OF THE INVENTION

The prior art is replete with bottle closures for temporarily sealing beverage containers to permit removal of a portion of a carbonated beverage and then resealing the container to retain the remaining portion of the carbonated beverage in a carbonated state therein. Generally, such devices include a plunger or a spring and some means to seal the closure to the bottle top. Unfortunately, the closures usually have multiple parts and elaborate structures which make the units costly, difficult to clean and often impede their efficiency of operation.

The present invention comprises a three-part beverage closure cap which can be made from a single polymer plastic material and is simple to use and clean. In addition, if needed, the beverage closure cap can be disassembled and reassembled by the user.

BRIEF DESCRIPTION OF THE PRIOR ART

U.S. Pat. No. 2,325,920 shows a bottle cover having a spring-loaded valve.

U.S. Pat. No. 2,678,747 shows a bottle closure with a compressible washer located between the top of the bottle and the bottle closure to seal off a bottle.

U.S. Pat. No. 2,685,978 shows a liquid-dispensing cap provided with threads with a sealing member held against the bottle.

U.S. Pat. No. 3,275,201 shows a flux-dispensing mechanism having a valve plug and push top for opening and closing the container.

U.S. Pat. No. 4,676,411 shows a stopper for a coffee container or the like having a lever arm for activating a valve to open and close the container.

U.S. Pat. No. 4,715,516 shows a dispenser for carbonated beverages which simultaneously lets air into the container while letting liquid out.

U.S. Pat. No. 4,742,942 shows a faucet for stabilizing foam draft of beer as it is dispensed.

U.S. Pat. No. 4,801,053 shows a lever-activated valve for opening and closing a fuel can or similar article.

BRIEF SUMMARY OF THE INVENTION

Briefly, the invention comprises a reusable closure for temporarily sealing a container to prevent escape of liquid and gas from the container with the closure having a molded, one-piece housing having internal threads for securing the housing to a container and a spout for discharging fluids therefrom. Located in the housing is an integral tapered sealing ring to prevent fluid from escaping from the housing. The housing includes a frusto-conical seat for engaging a valve stem with flared skirt for temporarily sealing liquid and gas within the container.

The closure contains only two moving parts, a resilient push top, located on top of the housing for finger access by the user with the valve stem connected to the underside of the push top, and the valve stem, axially displaceable to permit sealing and resealing of the skirt against the frusto-conical seat in the housing. The resilient push to provides a restoring force to return the valve stem and skirt to a closed condition where the fluid pressures within the container coact with the skirt to prevent escape of liquids or gasses past the skirt.

DESCRIPTION OF THE PREFERRED EMBODIMENT

Figure 1:
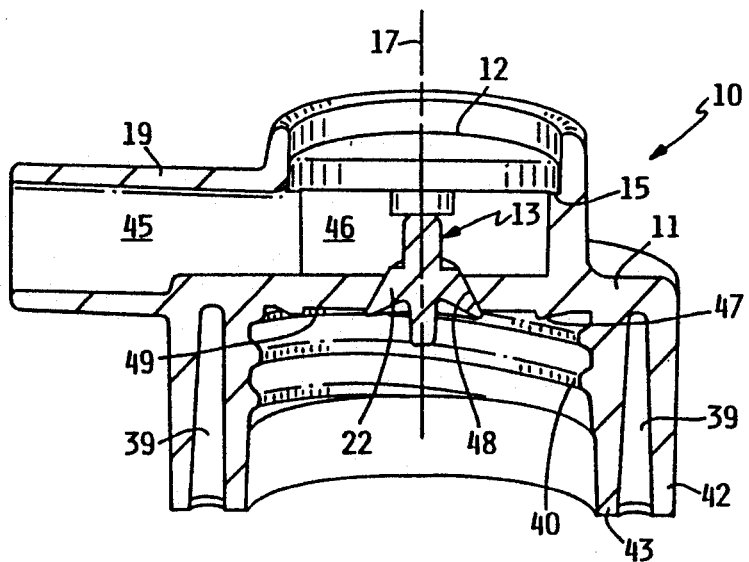
FIG. 1 shows a partial sectional view of the closure of the present invention.

Referring to FIG. 1, referance numeral 10 generally identifies a bottle closure in the closed condition for temporarily sealing a container such as a beverage bottle to prevent escape of fluids such as liquid and carbon dioxide gas from the container after the original bottle cap has been removed. The closure comprises a cylindrical, one-piece molded housing 11, and only two moving parts; A one-piece molded valve stem 13 and a one-piece molded resilient push top 12. Preferably all of the components are made from non-corrosive materials such as polymer plastic, which is suitable for use with fluids and liquids. In the preferred embodiment, the body component is made of polypropylene and the button and valve are made of polyethylene.

The cylindrical, one-piece molded housing 11 has a female thread 40 for engaging a ridge or thread on the top portion of a bottle (not shown). Located inside bottle closure 10 is a circular underside 49 having a concentrically located integral, outwardly tapered sealing ring 47 for sealing against the top of the bottle to prevent fluid from escaping between housing 11 and the bottle top when the bottle closure 10 is secured to the bottle top. To provide ease in molding, housing 11 is molded with a first cylindrical wall 43 and a second outer cylindrical wall 42 separated by webs 39.

One of the purposes of tapered sealing ring 47 is to ensure that the sealing ring makes complete and total contact with the entire bottle top, and can be compressed around the periphery of the bottle top by turning the housing 11 onto the bottle top to thereby form a fluid-tight seal to prevent escape of liquids and gasses from the bottle. Another purpose is to accommodate various-sized bottle tops. Sealing ring 47 forms a taper angle of approximately 15° with underside 49 of housing 11. While a greater or lesser taper angle could be used, 15° has been preferred for most uses. Generally, a lesser degree of taper reduces the ability of the sealing ring 47 to work effectively with uneven-topped bottles. Similarly, too great a taper may render the sealing ring 47 ineffective to seal against the top or the bottle. The integral sealing ring 47 prevents loss of the sealing ring during washing and cleaning as well as prevents residue from collecting under the sealing ring during normal use.

Located on the side of housing 11 is a spout 19 having a fluid passage 45 for directing fluid from a central chamber 46. After a bottle is cleared of its contents, bottle closure 10 can be easily unscrewed from bottle with the help of spout 19 which is used as a lever.

Figure 2:
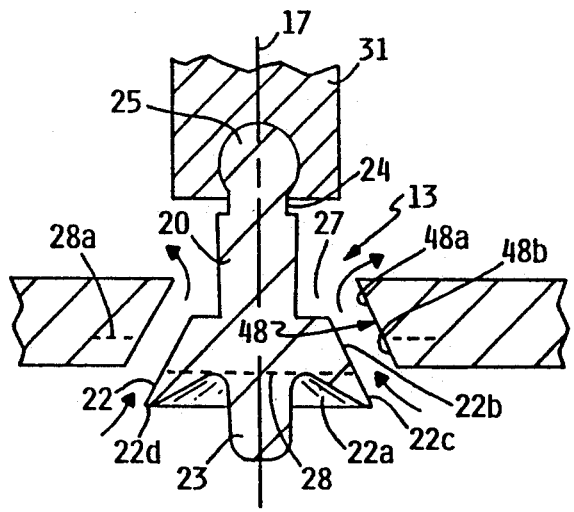
FIG. 2 shows a sectional view of the valve stem of FIG. 1 which is shown axially displaced to an open condition to allow fluid to escape.

FIG. 2 shows a partial sectional view of valve stem 13 and housing 11 in the open condition. Located in axial displaceable condition in housing 11 is valve stem 13 having a ball 25 located on one end and, on the opposite end 23, a two-part frusto-conical or flared sealing skirt 22 which contains an annular hollow region 22a creating different physical characteristics in skirt 22. That is, there comprises an upper substantially rigid region or rigid sealing skirt 22b (located below the dotted line 28) and a more flexible sealing region or sealing skirt 22c located below the dotted line 20a. The thickness of the skirt 22c tapers down to a narrow region or lip 22d. As the skirt narrows, it becomes more flexible to thus facilitate sealing contact with housing 11.

Located in housing 11 is an opening 27 surrounded by an annular seat 48 which includes an upper substantially rigid frusto-conical seat 48a for mating with skirt 22b located above line 28a and a substantially rigid frusto-conical seat 48b (located between dotted line 28b) for mating with flexible skirt 22c. Upper frusto-conical seat 48a and upper skirt 22b are sufficiently rigid to prevent skirt 22 from being pushed through opening 27 by the internal fluid pressures in the bottle. The lower frusto-conical seat is also rigid, while the lower, more flexible skirt 22c becomes less rigid as it flares outward to provide a secondary low pressure fluid-sealing member to seal opening 27. That is, since the internal fluid pressure acts in hollow 22a, it forces flexible skirt 22a radially outward to form a fluid-tight seal between frusto-conical seat 48b and flexible skirt 22c. That is, the flexibility of skirt 22c compensates for irregularities or distortions in the sealing skirt 22 and/or seat 48. As a result, the top portion of sealing skirt 22b functions as a valve stop to prevent skirt 22 from being forced through opening 27 by the fluid pressures, while the lower, more flexible skirt portion 22c is sufficiently flexible to be responsive to the fluid pressures in the container and, consequently, is forced radially outward to flex in response to the fluid pressure thereto to form an intimate, fluid-tight contact with the lower, rigid seat 48b to prevent fluid from passing therebetween.

Figure 3:
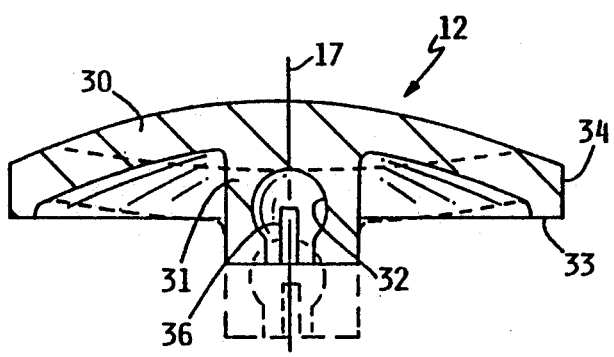
FIG. 3 shows a sectional view of the resilient push top in the unflexed condition (solid lines) and the flexed condition (dashed lines).

FIG. 3 illustrates the resilient push top 12. Resilient push top 12 comprises a dome-type portion 30 having a cylindrical extension 31 with a socket 32 for engaging ball 25 of valve stem 13. A slot 36 is located on one side of the extension to permit expansion of the cylindrical extension for insertion of the ball 25 of the stem into socket 32. A central axis 17 extends through the central portion of resilient push top 12 as it does through valve stem 13 and through housing 11. The dotted lines in FIG. 3 illustrate that under finger pressure, the dome 30 flexes and can be pushed downward to axially displace valve stem 13 along axis 17 When the finger pressure is released, the coaction of the material of dome top 30 pops and its shape causes the dome top 30 to pop back to the condition indicated by the solid lines in FIG. 3. As it does so, it draws valve stem 13 and skirt 22 to an upward or closed condition as shown in FIG. 1.

FIG. 1 shows a housing 11 including lower annular edge 15 which supports the outer, peripheral edge 33 of push top 12 (FIG. 2). The use of a resilient push top permits the closure to normally remain in a closed condition and to be opened by finger pressure without the help of springs.

In operation of the closure, the user screws threads 40 in housing 11 onto a bottle top until the integral sealing ring 47 contacts and forms a 360° seal against the top of the bottle. Hand tightening of housing 11 is sufficient to activate sealing ring 47. The bottle closure 10 is now ready for use. To use the bottle closure 10, the user depresses on the top of the resilient, flexible push top 12 to forceibly push the top downward as indicated by the dotted lines in FIG. 3. Forcing the top downward displaces the valve stem 13 downward (FIG. 2) displacing skirt 22 from seat 48 creating an opening 27 for fluid to escape therefrom into chamber 46. As the bottle and the Bottle closure 10 are tipped, the fluid flows from chamber 46 through passage 45 and out spout 19. Once the desired amount of liquid is removed from the container, the user releases the finger pressure on top of the push top 12 allowing the inherent resiliency of push top 12 to flex upward which pulls the valve stem 13 upward. As it does so, skirt 22 is drawn upward but is prevented from passing through opening 27 by upper, substantially rigid annular seat 48a while the lower, annular flexible skirt 22c flexes under the pressure within the container to form a fluid-tight seal against a lower seat 48b, thus capturing and retaining the fluids and the gasses within the bottle.

I claim:

1. A reusable closure with only two moving parts for temporarily sealing a container to prevent escape of fluids from the container comprising:

a housing, said housing having threads for securing said housing to a surface, said housing having a spout for discharging fluids therefrom, said housing having an integral, tapered sealing ring to prevent fluid from escaping therepast, said housing having an opening with a frusto-conical seal located therearound;

a resilient push top, said resilient push top having an extension with a socket housing;

a valve stem extending through said opening, said valve stem having a ball on one end for mating engagement of said socket housing to permit displacement of said push top and said valve stem as a unit; and a flared skirt located on said valve stem for sealing against said frusto-conical seat to prevent fluid from flowing therepast, said flared skirt having a first substantially rigid sealing region to prevent said flared skirt from being forced through the opening by fluid pressure and a second more flexible region to permit fluid pressure forces to force said flared radially outward and into a sealing condition around the opening.

2. The reusable closure of claim 1 wherein said housing, said resilient push top and said valve stem are made of a polymer plastic.

3. The reusable closure of claim 2 wherein said polymer plastic is polyethylene.

4. The reusable closure of claim 1 wherein said tapered sealing ring has a taper of approximately 15° degrees.

5. The reusable closure of claim 1 wherein said push top has a cylindrical shape with a dome top for finger engagement.

6. The reusable closure of claim 5 wherein said flared skirt includes a hollow, annular region to increase the flexibility of the flared skirt proximate the hollow, annular region.

7. The reusable closure of claim 6 wherein said resilient push top has sufficient resiliency to pull said valve stem and said flared skirt into a sealing condition in said housing.

8. A reusable closure for temporarily sealing a container to prevent escape of fluids from the container comprising:
- a housing, said housing having threads for securing said housing to a surface, said housing having a first opening for discharging materials therefrom, said housing having a sealing ring to prevent materials from escaping therepast, said opening in said housing having a seat located therearound;
- a resilient push top;
- a valve stem extending through said opening, said valve stem having one end connected to said push top to permit displacement of said push top and said valve stem as a unit; and
- a flared skirt located on said valve stem for sealing against said seat to prevent materials from flowing therepast, said flared skirt having a first substantially rigid sealing region to prevent said flared skirt from being forced through the opening by materials and pressures, and a second more flexible region to permit materials and pressures to flex said flared skirt radially outward and into a sealing condition around the opening in response to the material and pressures acting thereon.

* * * * *